United States Patent [19]

Vodinh et al.

[11] Patent Number: 4,628,237
[45] Date of Patent: Dec. 9, 1986

[54] MOTORIZED UNIT FOR HOME ENTERTAINMENT DEVICES

[75] Inventors: Hien Vodinh; Robert E. Pooler, both of Knoxville, Tenn.

[73] Assignee: NAP Consumer Electronics Corp., New York, N.Y.

[21] Appl. No.: 761,132

[22] Filed: Jul. 31, 1985

[51] Int. Cl.[4] ............................................. G05G 5/00
[52] U.S. Cl. ................................... 318/626; 318/266
[58] Field of Search ....................... 318/626, 265, 266

[56] References Cited

U.S. PATENT DOCUMENTS 2,755,423  7/1956  Hager ............................. 318/266 X
2,912,632  11/1959  Turtil ............................. 318/266 X Primary Examiner—William M. Shoop, Jr.
Assistant Examiner—Saul M. Bergmann
Attorney, Agent, or Firm—Thomas A. Briody; William J. Streeter; Marianne R. Rich

[57] ABSTRACT

A motorized drawer is moved from a fully closed to a fully open position, or vice versa, in response to user activation of a single pole double throw switch. The motor moving the drawer is connected to the user activated control switch and to a limit switch. Whenever the drawer reaches one of the end positions, a limit switch opens the circuit through which the motor was energized to move the drawer to that position. At the same time, the limit switch partially completes the circuit for energizing the motor in the opposite direction. The latter circuit is completed when the user again activates the control switch, i.e. completes the circuit allowing current flow through the motor in the direction required to drive the drawer to the other end.

4 Claims, 6 Drawing Figures

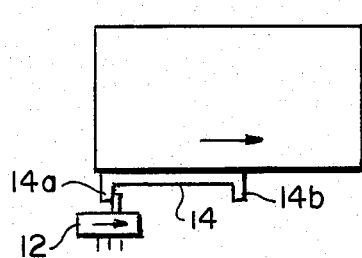
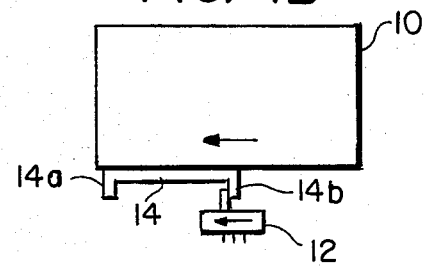
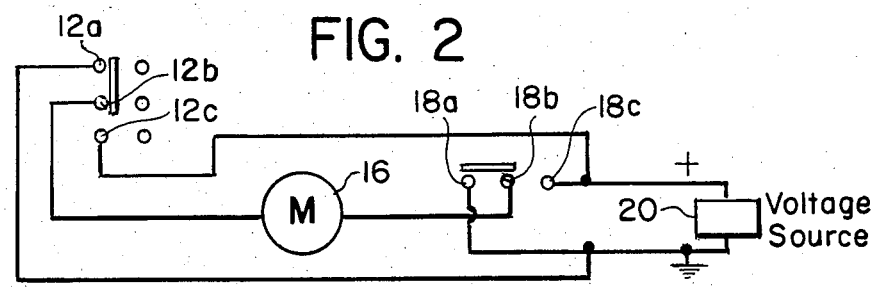
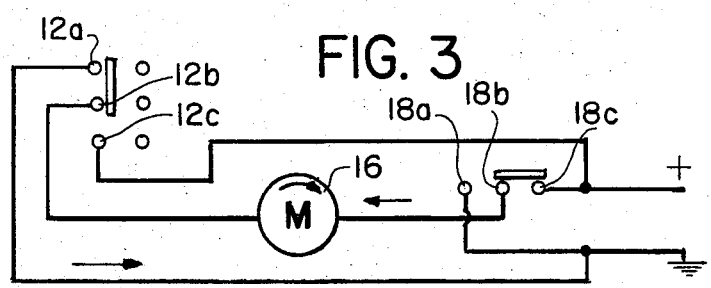
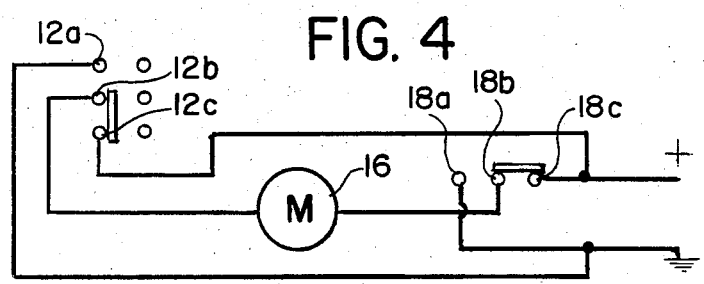
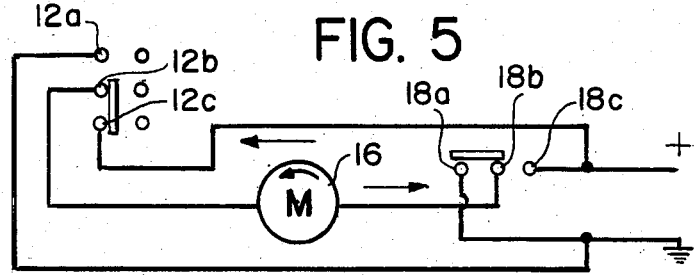

MOTORIZED UNIT FOR HOME ENTERTAINMENT DEVICES

FIELD OF THE INVENTION

The present invention relates to cabinets for entertainment appliances such as television receivers or stereo sets and, more particularly, to apparatus for effecting and controlling movement of an appliance-containing unit such as a drawer relative to the cabinet.

BACKGROUND OF THE INVENTION

Cabinets especially designed to house home entertainment apparatus such as television receivers stereo equipment or CD players are available in great numbers. In some of these, custom control panels or other items are contained in a drawer. These drawers are often difficult and inconvenient to open and close.

SUMMARY OF THE INVENTION

It is an object of the present invention to implement a drawer for home entertainment equipment which is simple to open and close, is inexpensive to manufacture, and operates reliably.

In accordance with the present invention, apparatus is provided which moves an appliance-containing unit of a cabinet, e.g. a drawer in the cabinet, from a first to a second predetermined position and from the second predetermined position back to the first predetermined position relative to the cabinet in response to user activation. The apparatus includes a reversible motor which moves the drawer from the first, open position to the second or closed position or vice versa when energized in a first or second flow direction, respectively. A user operable control switch has a first and second control position energizing the motor in the second or first direction, respectively. A limit switch is connected to the motor winding and to the control switch. The limit switch has a first operating position in which the energization of the motor in the first direction is maintained, while that in the second direction is blocked. It has a second operating position in which the opposite is true, i.e. energization in the second direction is maintained and that in the first direction is interrupted. Finally, two levers are provided which are mounted on the moving unit and which switch the limit switch to the second or first operating condition, respectively, when the unit is within a predetermined distance of the first or second predetermined position, respectively.

It will be noted that the limit switch not only prevents the drawer from traveling too far in the direction in which it has been started, but also prevents incorrect operation of the control switch from causing damage. The drawer will not, for example, attempt to move further in the "open" direction when the drawer is already open even if the control switch is mistakenly switched to the "open" position. At the same time, the movement back to the closed position can start immediately after the drawer has reached the fully opened position, since the limit switch automatically completes the circuit for the reverse drive when either end position is reached.

Power consumption is minimized, since the limit switch interrupts the motor drive circuit when the drawer is sufficiently close to the desired end position that inertia will carry it there after power is removed.

The present invention, as well as additional objects and advantages thereof, will be more fully appreciated from the following detailed description when considered in connection with the accompanying drawing, in which:

BRIEF DESCRIPTION OF THE DRAWING

FIGS. 1A and 1B are schematic diagrams illustrating the motorized drawer with associated cam and limit switch in the open and closed position, respectively;

FIG. 2 is a schematic diagram showing the motor control circuit during "parking" of the closed drawer;

FIG. 3 is a schematic diagram of the motor control circuit during movement of the drawer from closed to open position;

FIG. 4 is a schematic diagram illustrating the motor control circuit as the drawer reaches the open position; and FIG. 5 is a schematic diagram illustrating the motor control circuit as the drawer moves from the open to the closed position.

DESCRIPTION OF THE PREFERRED EMBODIMENT

Although the preferred embodiment illustrated herein is of a motorized drawer, i.e. of a straight line movement of one part of the cabinet relative to another, it is equally applicable to situations where pivoting is required. An example of the latter would be the pivoting of a television set relative to its cabinet for user controlled selection of the viewing angle.

It should further be noted that the same reference numerals are used throughout all figures to indicate the same parts.

Referring now to FIGS. 1A and 1B, a drawer 10 is to be moved relative to the cabinet (not shown) in the direction of the arrow of FIG. 1A for opening the drawer, and in the direction of the arrow of FIG. 1B for closing the drawer. A single pole double throw limit switch is mounted on the cabinet. Limit switch 12 is activated by limit switch operating means, here a cam 14 which has a first cam lever 14a and a second cam lever 14b. Cam 14 is mounted on drawer 10 and moves with the drawer. When drawer 10 is close to the fully open position as illustrated in FIG. 1A, cam lever 14a pushes limit switch 12 from a first to a second operating position. On the other hand, when drawer 10 is almost closed, lever 14b switches limit switch 12 from the second to the first operating position. Limit switch 12 remains in the position determined by the cam until it is reactivated.

Movement of the drawer is controlled by a motor 16 coupled to the drawer by means of a conventional gear rack which is built into the latter. In a preferred embodiment, the motor is a D.C. motor, whose armature winding is herein referred to as a control winding.

The interconnections between the control winding on the one hand and control switches on the other hand during the four intervals associated with the drawer movement are shown in FIGS. 2-5. Let it be assumed that the drawer is first in the fully closed position and that the interconnections and limit and control switch positions are as illustrated in FIG. 2. There, three terminals of limit switch 12 are designated by reference numerals 12a, 12b, and 12c, respectively. Similarly, three terminals of a user-operable control switch 18 are designated by reference numerals 18a, 18b, and 18c, respectively. Terminal 12a is directly connected to terminal 18a, both terminals being connected to ground potential. The control winding of motor 16 is connected between terminals 12b and 18b, while terminal 12c is directly connected to terminal 18c. Terminal 18c is connected to the positive side of a voltage source 20, whose negative side is connected to ground potential. The position of selector switch 18 illustrated in FIG. 2 and connecting terminal 18a to terminal 18b is herein referred to as the second control position, while the switch position illustrated in FIG. 3, connecting terminal 18b to terminal 18c is called the first control position.

Thus when switches 12 and 18 are in the positions illustrated in FIG. 2, no movement of the drawer can take place since the circuit through the control winding of motor 16 is not complete.

In FIG. 3, on the other hand, the user has thrown switch 18 from the second to the first control position. In this position, control switch 18 connects the positive side of the battery through the motor control winding to terminal 12b of switch 12. As indicated in FIG. 3, terminal 12b is, at this time, still connected to terminal 12a which, in turn, is connected to ground potential. The energizing circuit for motor 16 is thus complete. The motor turns and, through the associated gear rack, causes a motion of the drawer from the closed to the open position.

When the drawer reaches the open position as illustrated in FIG. 1a, lever 14a pushes switch 12 from the first to the second operating position, i.e., as illustrated in FIG. 4, terminal 12b is now directly connected to terminal 12c, while the circuit between terminals 12a and 12b has been opened. The energization of motor 16 is interrupted and the drawer remains in the open position until the user again activates control switch 18.

When the user is ready to close the drawer, he again activates switch 18. As illustrated in FIG. 5, this opens a connection between contacts 18b and 18a, while short-circuiting contact 18a to contact 18b. At this point, current flows from the positive side of the battery through closed contacts 12b-12c of switch 12 through the energizing winding of motor 16, and then through directly connected contacts 18a and 18b to ground potential. It will be noted that current flow through the energizing winding of motor 16 is in the direction opposite to that illustrated in FIG. 3. The direction of rotation of the motor is thus opposite to that illustrated in FIG. 3 and the drawer goes from an open to a closed position.

The above-described cycle repeats when switch 18 is next activated by the user.

The above-described control circuit assures movement of the drawer from its open to its closed position or vice versa whenever the user selects the proper position on switch 18. Inadvertent selection of the wrong position of the switch cannot result in any damage since energization of the motor in the wrong direction is prevented by the open limit switch contacts.

While the invention has been illustrated in a preferred embodiment, various modifications and changes in the structure and operation thereof will be evident to one skilled in the art and are intended to be encompassed in the following claims.

We claim:

1. Apparatus for moving an appliance containing unit of a cabinet from a first to a second predetermined position or from said second to said first predetermined position relative to said cabinet in response to user activation, comprising
    motor means for moving said unit from said first toward said second or from said second toward said first predetermined position upon energization in a first or second direction, respectively;
    user operable control switch means having a first and second control position for energizing said motor means in said second or first direction, respectively;
    limit switch means connected to said motor means and said control switch means, said limit switch means having a first operating position adapted to maintain energization of said motor means in said first direction and prevent energization of said motor means in said second direction, and a second operating position maintaining energization of said motor means in said second direction and interrupting energization of said motor means in said first direction, said limit switch means comprising a single pole double throw switch mounted on said cabinet in a predetermined position relative to said appliance containing unit; and
    limit switch operating means for moving said limit switch to said second or first operating position, respectively, when said unit is within a predetermined distance of said first or second predetermined position, respectively, said limit switch operating means comprising switch activating means mounted on said unit for movement therewith.

2. Apparatus as set forth in claim 1, wherein said control switch means comprises a single pole double throw switch.

3. Apparatus as set forth in claim 2, wherein said control switch means has a first, second and third control terminal, said second control terminal being connected to said first or third control terminal when said control switch means is in said first or second control position, respectively;
    and wherein said limit switch means has a first, second and thrird limit terminal, said second limit terminal being connected to said first or said third limit terminal for energization of said motor means in said first or said second direction, respectively.

4. Apparatus as set forth in claim 3, wherein said first control terminal is directly connected to said first limit switch terminal, said third control terminal is directly connected to said third limit terminal, and wherein said motor means has a first and second energization terminal respectively connected to said second control terminal and said second limit terminal.

* * * * *